C. E. HUGHSON.
GEARING.
APPLICATION FILED FEB. 9, 1911.
1,008,341.
Patented Nov. 14, 1911.
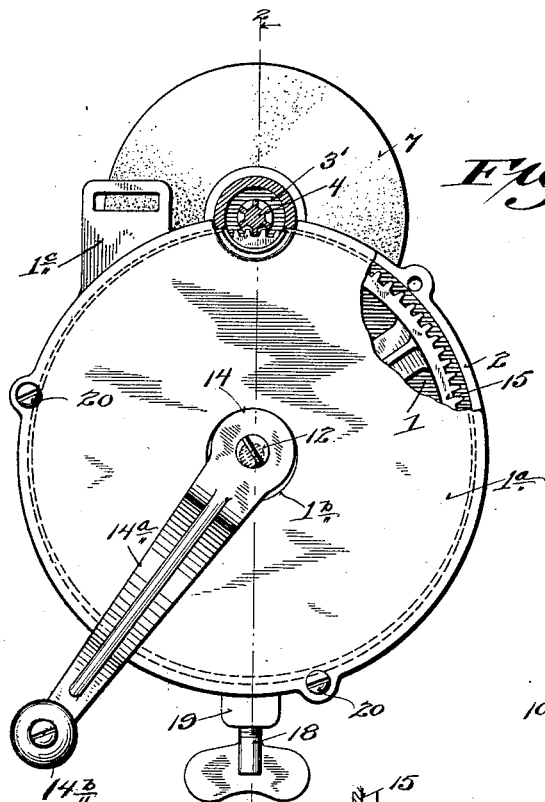
Fig. 1.
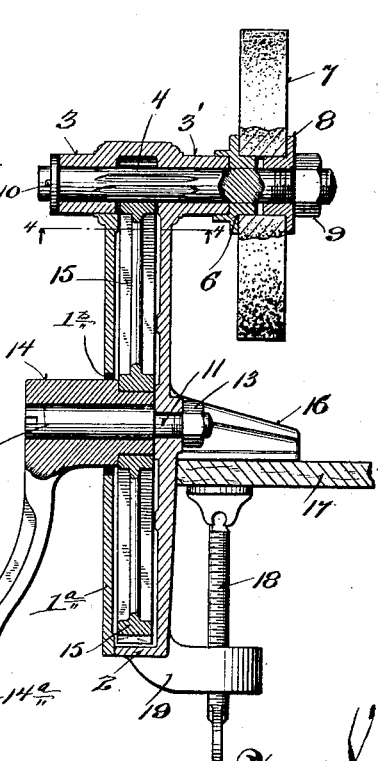
Fig. 2.
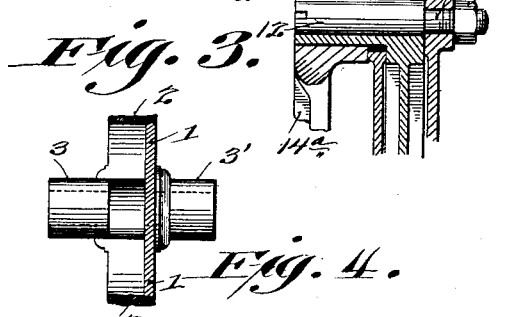
Fig. 3.
Fig. 4.
Witnesses:
Inventor:
Charles E. Hughson
By Oliphant & Young.
Attorneys.

UNITED STATES PATENT OFFICE.

CHARLES E. HUGHSON, OF MILWAUKEE, WISCONSIN.

GEARING.

1,008,341.  Specification of Letters Patent.  Patented Nov. 14, 1911.

Application filed February 9, 1911. Serial No. 607,605.

*To all whom it may concern:*

Be it known that I, CHARLES E. HUGHSON, a citizen of the United States, and resident of Milwaukee, in the county of Milwaukee and State of Wisconsin, have invented certain new and useful Improvements in Gearing; and I do hereby declare that the following is a full, clear, and exact description thereof.

The general object of my invention is to provide a simple and economically constructed gearing and housing for grinders or like machines, the parts of which are so designed with reference to assemblage as to eliminate the usual jig work necessary to insure centering of the several bearings for the driving gearing in machines of this class.

Another object is to provide a flanged gear housing with integral journal bearings spaced apart for the reception of a toothed grinder-wheel arbor of uniform diameter in conjunction with an eccentric stud whereby the gearing is adjusted as to mesh and its assemblage facilitated.

With the above objects in view the invention consists in what is herein shown, described and subsequently claimed.

In the drawings Figure 1 represents a face view of a grinder embodying the features of my invention with parts broken away and parts in section to better illustrate structural features; Fig. 2, a longitudinal sectional view of the same, the section being indicated by line 2—2 of Fig. 1; Fig. 3, a detail sectional view of a modification of the hand-crank connection with the main driving gear, and Fig. 4, a detail sectional view of a portion of the housing, illustrating the grinder-wheel arbor bearings.

Referring by characters to the drawings, 1 represents a circular plate portion of a housing having an edge flange 2, which flange is interrupted by alined boxes 3, 3', that extend in opposite directions from the flange, the boxes being spaced apart within the housing to present clearance for the exposed toothed face 4 of an arbor 5, which arbor is journaled in said boxes, the journal ends thereof being of the same diameter as the general diameter of the arbor. The arbor is provided with a flanged collar 6, which is shrunk or otherwise secured thereto for the reception of a grinder-wheel 7, the same being held in position by means of a clamping collar 8 and nut 9 that is in threaded connection with the end of the arbor. The arbor is held against longitudinal movement in its boxes by a washer and cotter-pin 10, fitted to that end of the arbor opposite the grinder-wheel, the washer being arranged to abut the end-face of the adjacent box 3. The housing-plate 1 is provided with a centrally disposed aperture for the reception of the shank 11 of an eccentric stud 12, the shank being threaded and held by a lock-nut 13. The hub portion 14 of a main gear-wheel 15 is mounted upon the stud 12, which hub, as shown in Fig. 2, is provided with a reduced section that is secured to the gear-wheel. The hub-portion 14 of the gear-wheel has extending therefrom a hand-crank 14$^a$ that carries a handle 14$^b$, whereby power is applied. The housing is also provided with rearwardly extended feet 16 adapted to rest upon a bench or other suitable support 17, there being a clamp-screw 18 carried by an ear 19 that projects from said housing, the screw being arranged in opposition to the feet, whereby the grinder is securely clamped to the bench, which is interposed between said feet and screw.

After the grinder gears are assembled within the housing, as shown in Fig. 2, a face-plate 1$^a$, having a central aperture 1$^b$ is fitted to the edge of the housing flange 2, being secured to said flange by suitable screws 20. As shown in Fig. 2, the aperture 1$^b$ in this face-plate is of such diameter that said face-plate may be slipped over the handle 14$^b$ and crank 14$^a$ to its position adjacent to the gear-wheel 15, it being understood that the gear-wheel and hub 14 are practically one piece. The face-plate and gearing are then mounted upon the eccentric stud 12, the face-plate being thereafter secured by the screws 20.

In the construction of grinders of the character to which my invention pertains it is usual to form the housing in two parts which are centrally divided, each having a box for the arbor corresponding to the boxes 3, and 3' illustrated in my improved device. The two parts with their separate boxes are thereafter clamped together with the main gear-wheel incased therebetween and mounted upon a non-adjustable stud and if these separate boxes are perfectly alined the grinder arbor can be inserted into said boxes prior to the assemblage of the two-part housing, whereby meshed engagement of the toothed arbor and main gear-wheel is obtained, but, owing to the fact that the main gear-wheel is arranged to mesh with the toothed portion of said arbor, one end of the latter must be reduced in diameter so as to clear the teeth of the main gear-wheel when it is desired to withdraw the arbor for the purpose of inserting a different abrading wheel or analogous article. Hence by this reduction of the diameter of said arbor one of the boxes would have to be proportionately reduced and thus an uneven bearing surface with relation to the two boxes will result, causing uneven friction between the journals and said boxes.

By the construction as previously described in connection with my invention, these difficulties are overcome, the bearing-boxes being integral with one member, while the arbor is of the same diameter throughout, which arbor can be inserted into the position shown in Fig. 2 when the main gear-wheel 15 is dropped to clear said arbor by means of adjusting the eccentric pin 12. Thereafter the eccentric pin can be loosened by means of the nut 13 and turned to a position which will cause the main gear-wheel to move up and in mesh with the toothed pinion portion 4 of the grinder arbor and when the meshing engagement is adjusted correctly by means of a partial rotation of the eccentric stud, the clamping nut may be tightened. Thus it will be seen that a perfect meshing engagement between the pinion and gear-wheel is obtained while, at the same time, this adjustment can be utilized for compensation or wear in connection with the gear-teeth of the driving-members.

A further advantage in this construction is due to the fact that jig work is dispensed with as the center of the arbor bearings with relation to the center of the housing is immaterial to the successful assemblage of the gears.

As illustrated in Fig. 1, the housing is provided with an apertured lug 1ᶜ for the purpose of receiving any suitable tool rest not shown.

In some instances where it is desirable to provide an absolutely dust proof housing, I may construct the hand-crank in such manner that it is detachable from the main gear-wheel 15, in which case, as shown in Fig. 3, the gear-wheel is provided with an integral hub extension 21 that projects through the aperture in the face-plate 1ᵃ. The hand-crank 14ᵘ, in this instance, is provided with a hub 22, which is fitted over the gear-wheel hub 21, the hand-crank hub 22 being arranged to abut the face of the face-plate 1ᵇ surrounding its central aperture, whereby a dust-proof closure thereof is had, the hand-crank hub being secured to the gear-wheel hub by a set-screw 23 as shown, or in any other suitable manner. By constructing the hand-crank connection in this form, the face-plate can be adjusted to its position with relation to the housing directly and thereafter the hand-crank is placed in position, thus obviating the necessity of slipping said face-plate over the hand-crank in the manner described in connection with that form illustrated in Fig. 2.

While I have shown and described the arbor with solid journal ends of the same diameter as the arbor with the pinion teeth cut in its face, it is apparent that, if desired, in some instances, the forward or keyed end of the arbor may be reduced and a steel bushing inserted thereon to compensate for this reduction, whereby the journal ends will be of the same diameter, but it is preferable to form the arbor in a single piece as stated.

I claim:

1. A machine of the character described comprising a centrally apertured circular housing having a flanged edge, integral alined journal-boxes extending from the flanged edge of the housing in opposite directions, a toothed arbor of uniform diameter throughout its length journaled in the boxes, a gear-wheel for engagement with the toothed arbor mounted in the housing, and means for adjusting the gear-wheel with relation to the arbor.

2. A machine of the character described comprising a centrally apertured circular housing having a flanged edge, integral alined journal-boxes extending from the flanged edge of the housing in opposite directions, a toothed arbor having journal ends of uniform diameter mounted in the boxes, a centrally disposed eccentric stud carried by the housing, and a gear-wheel mounted upon the stud engageable with the toothed arbor.

3. A machine of the character described comprising a centrally apertured circular housing having a flanged edge, integral alined journal boxes extending from the flanged edge of the housing in opposite directions, a toothed arbor having journal ends of uniform diameter mounted in the boxes, a centrally disposed eccentric stud adjustably secured to the housing, a gear-wheel having a hub mounted upon the stud, the gear-wheel being in meshing engagement with the toothed arbor, a face-plate secured to the housing flange, and a hand-crank carried by the gear-wheel hub.

4. A machine of the character described comprising a one-piece centrally apertured circular housing having a flanged edge extending at a right angle to its circular portion, and integral alined journal boxes extending transversely from the flanged edge of the circular housing in opposite directions, the housing being provided with feet and an ear extending therefrom, a clamping screw carried by the ear disposed opposite the housing feet, a toothed arbor mounted in the journal-boxes, a centrally disposed stud extending from the aforesaid housing, means for adjusting the stud, a gear-wheel mounted upon said stud, and a face-plate secured to the housing flange adapted to inclose the gear-wheel.

5. A machine of the character described comprising a one piece centrally apertured circular housing having a flanged edge, integral alined journal boxes extending transversely from the flanged edge of the circular housing in opposite directions, a toothed arbor mounted in the journal boxes, a centrally disposed eccentric stud secured within the housing aperture, a gear-wheel mounted upon the stud having meshing engagement with the toothed arbor provided with a hub extension, an apertured face-plate fitted about the gear-wheel hub, means for securing the face-plate to the circular housing, and a crank having a hub secured to said gear-wheel hub, the inner face of said crank hub being adapted to form a closure for the face-plate aperture.

In testimony that I claim the foregoing I have hereunto set my hand at Milwaukee in the county of Milwaukee and State of Wisconsin in the presence of two witnesses.

CHARLES E. HUGHSON.

Witnesses:
MAY DOWNEY,
GEO. W. YOUNG.

---

Copies of this patent may be obtained for five cents each, by addressing the "Commissioner of Patents, Washington, D. C."